No. 715,064. Patented Dec. 2, 1902.
J. HEDLUND.
SHAFT BEARING FOR CENTRIFUGAL PUMPS.
(Application filed June 27, 1902.)
(No Model.)
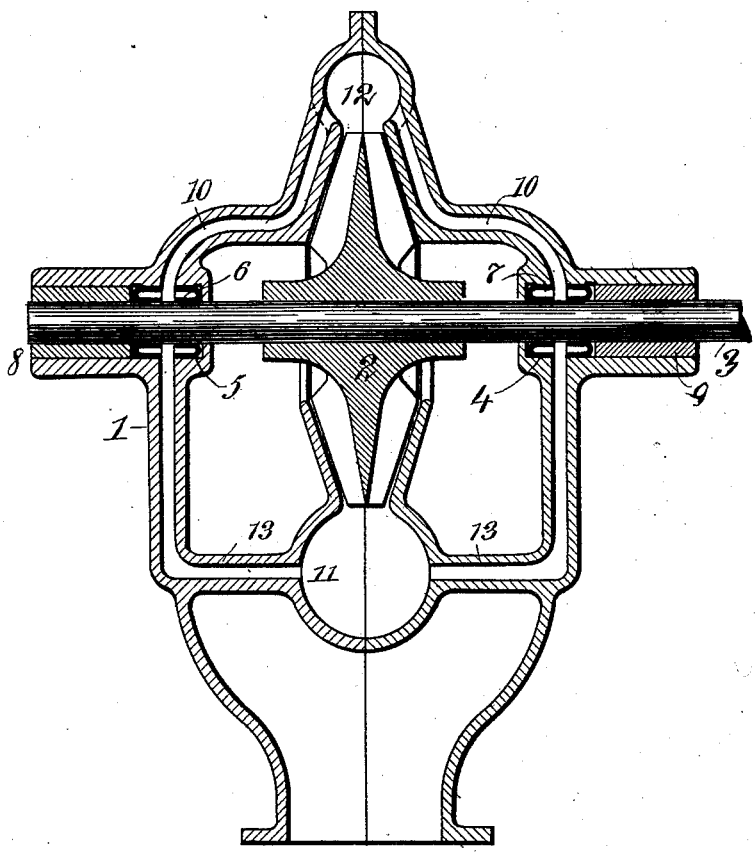
WITNESSES:
INVENTOR
Johan Hedlund
BY
his ATTORNEY

UNITED STATES PATENT OFFICE.

JOHAN HEDLUND, OF STOCKHOLM, SWEDEN.

SHAFT-BEARING FOR CENTRIFUGAL PUMPS.

SPECIFICATION forming part of Letters Patent No. 715,064, dated December 2, 1902.

Application filed June 27, 1902. Serial No. 113,519. (No model.)

*To all whom it may concern:*

Be it known that I, JOHAN HEDLUND, a subject of the King of Sweden and Norway, and a resident of Stockholm, Sweden, have invented a new and useful Improvement in Shaft-Bearings for Centrifugal Pumps, of which the following is a specification.

The invention relates to centrifugal pumps, and more particularly to the shaft thereof.

The invention consists in the combination, with the shaft, of a chamber surrounding said shaft, which chamber may contain any suitable packing device, and means for establishing liquid circulation through said chamber.

The object of the invention is to prevent accumulation of dust or grit in the packing-chamber to permit ready escape of air from said chamber when the pump is started and to allow of free drainage of the same when the pump is stopped.

The accompanying drawing shows a vertical section of a centrifugal pump embodying my invention.

1 is the pump-casing, and 2 the wheel supported on the shaft 3. Chambers 4 and 5 are formed by the inner portion of the casing surrounding the shaft, in which chambers may be placed leather packing-collars 6 7. The chamber is outwardly closed by sleeves or glands 8 9. With said packing-chambers the upper half 12 of the pressure-chamber of the pump communicates by the conduits 10 and the lower half 11 of said pressure-chamber by the conduits 13, formed in the casing. When the pump is started, air escapes from said packing-chambers 4 5 and they are at once completely filled with water, so that any danger of running the pump warm and destroying the collars 7 6 is obviated. While the pump is running, there is a constant circulation of water from the pressure-chamber through said packing-chambers, thus washing out any dirt which otherwise might accumulate and abrade the shaft. When the pump is stopped, the packing-chambers drain free of water.

I claim—

1. The combination, in a centrifugal pump, with the pump-wheel shaft, of a chamber surrounding the shaft at its bearing and provided with two passages connecting it with the pressure-chamber at different points, whereby circulation of the fluid acted upon by the pump will be established through said bearing-chamber, substantially as described.

2. The combination in a centrifugal pump, with the pump-casing having shaft-bearings and cooling-chambers at opposite sides of its pressure-chamber, passages connecting said chambers with the upper and lower sides of the pressure-chamber to cause a circulation throughout the chambers of the fluid acted upon by the pump, of a pump-wheel shaft mounted in said bearings and chambers, substantially as described.

3. The combination, in a centrifugal pump, with the pump-casing having cooling-chambers at opposite sides of its pressure-chambers, bearing sleeves or glands in the outer end of said cooling-chambers, packing in the inner portions, and passages connecting said cooling-chambers with the upper and lower sides of the pressure-chamber, to cause a circulation of the pump fluid through said cooling-chambers, of a shaft mounted in said sleeves or glands, substantially as described.

In testimony whereof I have signed my name to this specification in the presence of two subscribing witnesses.

JOHAN HEDLUND.

Witnesses:
WALDEMAR BOMAN,
P. PIDDERSTROLPE.